Sept. 20, 1971     R. H. MESINGER     3,606,383
ADJUSTABLE BICYCLE SADDLE SUPPORTS
Filed June 11, 1969

INVENTOR.
ROBERT H. MESINGER
BY William F. Mesinger
ATTORNEY

United States Patent Office 3,606,383
Patented Sept. 20, 1971

3,606,383
ADJUSTABLE BICYCLE SADDLE SUPPORTS
Robert H. Mesinger, Lakecrest Drive, Aunt Hack Ridge,
Danbury, Conn. 06810
Filed June 11, 1969, Ser. No. 832,053
Int. Cl. B62j 1/02
U.S. Cl. 280—283                                5 Claims

ABSTRACT OF THE DISCLOSURE

An elongated type bicycle saddle is vertically adjustably mounted on a bicycle frame by a vertically adjustable seat post secured under the front portion of the saddle and by support bars at the rear portion, the lower ends of the support bars being secured to the bicycle frame parts outside of the rear wheel, and the rear of the saddle being secured to the bars by clamps which encircle the bars, which clamps can be loosened and tightened to provide vertical positioning of the saddle along the bars. Preferably the bars include telescoping portions within coil springs that have lower ends secured to the lower parts of the bars and upper coil portions secured to the upper parts of the bars.

BACKGROUND OF THE INVENTION

This invention relates in general to bicycles and more specifically to high rise adjustable three point supports for elongated bicycle saddles.

THE PRIOR ART

Elongated saddles have their forward portions secured to the top of a seat post which is telescopically adjustable in the seat post tube of the bicycle frame and the rear of the saddle is fixedly secured by bolts at each side to a pair of support bars, the lower ends of which are bolted to the frame of the bicycle on each side of the rear wheel. Some limited vertical position adjustability is provided by use of several bolt holes in the lower ends of the bars. Since the bars are solid, the saddle is unsprung and the lower ends of the bars can project below wheel axle.

SUMMARY OF THE INVENTION

There is provided an improved supporting structure for mounting an elongated saddle on a bicycle frame that provides adjustment of the height of the saddle above the bicycle frame through a great range of heights above the lowest. This is attained while avoiding the hazard of having lower ends of support bars projecting substantially below the axle of the bicycle wheel. The forward part of the elongated saddle is attached to the upper end of a customary type high rise seat post while the rear portion of the saddle is secured to elongated support bars having their lower portions secured to the bicycle frame members on each side of the wheel. The manner of supporting the saddle to the support bars is by the use of ears on the saddle to which are secured special clamps having a structural feature that provides a non-slip grip of the clamps around the bars. The clamps are provided with higher pressure gripping areas in regions nearer the clamp bolt side. The clamps thus do not slip due to the forces of normal use of the bicycle even though the bars are highly polished and the clamp bolts are not excessively tightened. Any tendency to slip is further reduced in the preferred form of the invention, by making the support bars in two parts of different diameter tubing so that one part, preferably the upper, may slide telescopically within the other or lower part. The upper and lower parts are maintained in sliding relation by an encircling helical spring that spans the upper end of the lower tubular part of the support bar. Novel method of securing the ends of the spring to the respective tube parts is preferably employed for it is both simple and effective. The respective end coils of the spring are made to have smaller inside diameters than the outside diameters of the tube parts and the tube walls are correspondingly formed to have annular grooves in which the end coils nest and grip the tubes. The spring action of the support bars insulates the rider from road shocks of the rear wheel and also greatly reduces the sudden force of such shocks which might tend to propel the support bars through the clamps if there were no such spring action.

DESCRIPTION OF THE PREFERRED EMBODIMENT

Figure 1:
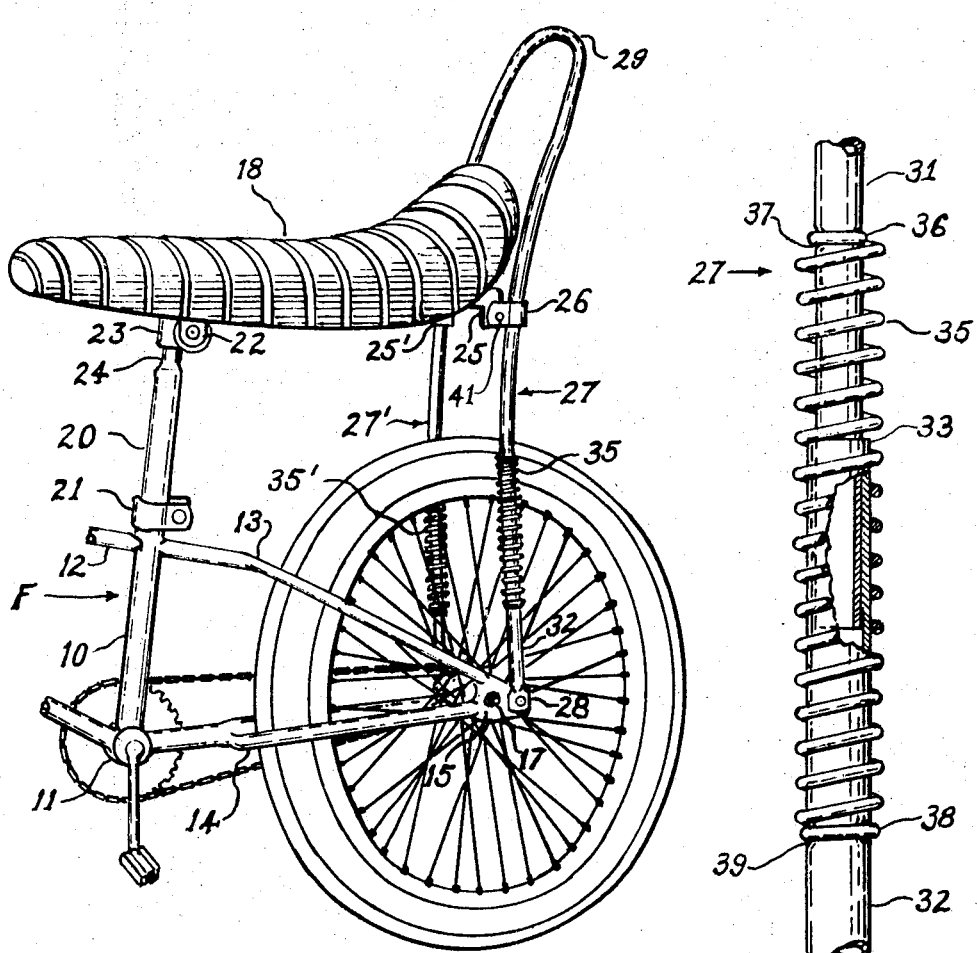
FIG. 1 is a perspective view of the rear part of a bicycle showing the saddle support structure of the invention mounted on the bicycle.

Referring to the drawing and particularly to FIG. 1, certain parts on the right side of the bicycle wheel assembly are hidden; but since these are opposite handed but otherwise duplicates of the corresponding parts seen on the left side of the wheel, such hidden parts will be referred to by the same numerals as the left side parts but with a prime mark added.

The bicycle frame, indicated generally at F, may be of the type having a tubular seat post frame member 10 which rises from the crank bearing housing 11 to a point above the upper frame member 12 and the upper rear wheel fork 13. The lower rear wheel fork 14 extends rearward from the crank bearing housing 11 with the legs thereof being joined to the corresponding legs of the upper fork 13 by axle support plates 15 and 15'. The customary wheel hub assembly is mounted between plates 15 and 15' on axle 17 that has its ends secured in the plates.

The saddle 18 may be of the elongated type, for example, variously named polo seat, banana seat, Hi-Rise seat which requires a rear support in addition to the customary seat post. The customary type seat post 20 is long enough to extend to desired heights as it slides within the seat post frame number 10 and is secured at the desired height by a clamp device 21 at the upper end of frame member 10.

The forward part of saddle 18 has ears 22 secured to its underside between which is secured a seat post clamp 23 that grips the upper end portion 24 of the seat post. The rearward part of saddle 18 has laterally spaced ears 25 and 25' to which are secured clamps 26 and 26', which are more specifically described hereinafter. These clamps encircle and grip tubular support bars 27 and 27' which may be of any desired cross-sectional shape, preferably tubular round as shown. The support bars are suitably fastened at their lower ends 28-28' to the outsides of the plates 15-15'. Preferably the tubing end is squeezed flat at 28 and provided with a bolt hole 30. The bars 27-27' may rise to any desired height above the clamps 26-26' and have any configuration at the upper parts. They could be separate, but are preferably joined by any means such as a back rest, or simply as shown by a U bend 29.

Figure 2:
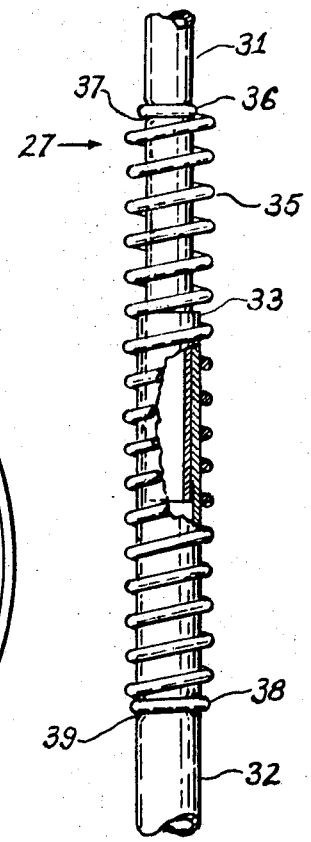
FIG. 2 is an elevational view on a larger scale of the lower parts of one of the support bars for the rear of the saddle with parts broken away and in section.
Figure 3:
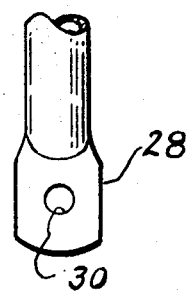
FIG. 3 is a fragmentary view in section of a portion of the lower spring coil and tubing.

The support bars 27 and 27' according to the invention may be made of one continuous piece of tubing and be gently rearwardly curved. To provide easier riding and a spring action for the rear of the saddle, the support bars are each made of two parts as more clearly shown in FIG. 2 and comprising an upper section 31 and 31' respectively and a lower section 32 and 32', the upper and lower sections being in telescoping relation. Specifically, the upper sections telescopically slide within the lower sections 32–32'. The upper and lower sections are maintained in such relation to each other that the upper section can slide within the lower section through a predetermined range which range of movement is controlled by helical springs 35 and 35' that encircle the bars and span the upper ends 33–33' of the lower sections 32–32'. The ends of the springs are secured to the respective sections by suitable means. As shown, the upper coil or coils 36 of the springs are forcibly made of smaller inside diameter than the external diameter of the upper section 31 so as to be indented into an inwardly deformed annular area 37 of the upper section tubing wall. Similarly as shown in detail in FIG. 3, the lower end coils 38 of the springs are secured to the lower section tubing 32 by being pressed into annular deformed areas 39 of the lower tube walls.

The springs 35 are designed to have a substantial length and possess a spring rate to provide the desired degree of downward movement of the upper sections 31–31' with respect to the lower sections 32–32' when a weight presses down at the rear of the saddle with a force equivalent to that produced when a rider sits on the saddle, such rider having a weight which is the average of that of the class of riders for which the bicycle is designed.

Since the seat post 20 is located between the front and rear wheels, it is less subject to road shock than the support bars 27–27' which receive road shocks directly from the rear wheel. Also the rider's body does not rest directly above the seat post but substantially to the rear thereof. Hence the spring action support bars help greatly to insulate the rider from road shocks.

A great advantage of the present invention is that it permits a very great degree or amplitude of vertical position adjustment of the saddle. So that a young rider can, as he grows taller, adjust the saddle higher and higher in a very simple and safe way; safe because no lower ends of support bars can extend below the wheel axle to catch obstructions as in a known construction; and simple because the clamps 26–26' when loosened can slip along a great length of the support bars. Thus the seat post, by use of the clamp 21, can be set at desired height and then the rear of the saddle is moved to desired position after which the clamps 26–26' are tightened.

According to the invention the clamps 26–26' are so constructed that the polished tubing of the support bars is gripped by them so as not to slip when the clamp bolts 41–41' are not excessively tightened.

Figure 5:
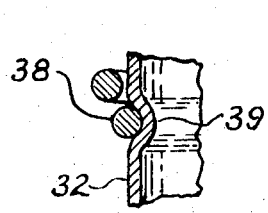
FIG. 5 is a view of a horizontal section taken on the line 5—5 of FIG. 4.
Figure 4:
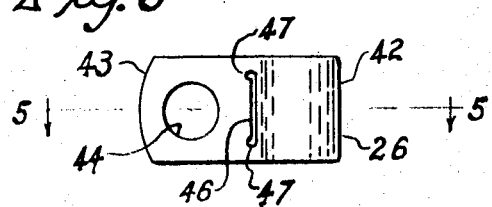
FIG. 4 is an elevational view of one of the special support bar tubing clamps.

Referring to FIGS. 4 and 5, the clamps are made with round portions 42 that will incompletely encircle the support bar tubing and to have the customary ears 43 with holes at 44 for a clamping bolt 41, the spacing of the ears being such that they will not come into complete contact when the bolt tightens the clamp about the support bar. The feature which enables the clamp to grip tightly without severe tightening of the bolt, is the dimple formation shown at 46 which is an indentation of the metal of the portion 42 along a narrow area adjacent the corner between the portion 42 and each of the ears 43. The dimple formation 46 preferably ends short of the top and bottom rims of portion 42 and its ends 47 are of slightly greater width and depth than the main part. These dimple formations effect a small inward upsetting of the inner metal wall of the portion 42 to provide pressure areas 48 against the bars when the clamp is closed on the bars by its bolt. This helps to provide a slip resisting grip on the support bar.

It is to be noted that the resiliency provided by the springs 35–35' soften the upward thrust caused by a road bump and thus reduce the shock that might tend to cause downward slippage of the clamps 26 if there were no springs. The spring action thus cooperates with the clamps to maintain the saddle at its desired height, as well as cooperating with the seat cushion to insulate the rider from road shocks.

A preferred embodiment of the invention having been described it is believed apparent that changes may be made in the construction and arrangement of the parts without departing from the spirit and scope of the invention.

I claim:

1. An adjustable bicycle saddle support assembly mountable on a bicycle frame having a substantially vertically adjustable seat post and rearward frame members on each side of the rear wheel, and an elongated saddle having forward means securable to such seat post and laterally spaced mounting means near the rear end; said assembly comprising telescoping bar structures on each side of the saddle and frame, each structure comprising an upper tubular section; a lower section of larger diameter adapted to be secured to such rearward frame members on each side of the rear wheel, the upper section slidingly telescoping within the lower section; a helical spring slidable around both sections and spanning the upper end of the lower section, said spring having the upper coils thereof secured to the upper section and the lower coils secured to the lower section, said spring having a length and spring rate to provide desired amount of resilient downward sliding of the upper section when a rider of average weight sits on the saddle; and a clamp adapted to clamp around the upper tubular section and be secured to a laterally spaced mounting means, the clamp comprising a strap formed to have a round portion for incompletely encircled the tubular section and projecting ears with holes for a clamping bolt, the ears being spaced so that they do not completely contact when the bolt is tightened said clamp having internal dimples caused by indentation of the metal along a narrow area of the outside wall of the round portion adjacent the corner between each of the ears and the round portion, said dimple formations ending short of the rims of the round portion to provide small inward upset areas of the inner wall of said round portion which provide concentrated pressure areas against the tubular section when the clamp is tightened.

2. An adjustable bicycle saddle support assembly mountable on a bicycle frame having a substantially vertically adjustable seat post and rear frame members on each side of the rear wheel, and an elongated saddle having forward means securable to such seat post and laterally spaced mounting means near the rear end; comprising support bars having lower portions adapted to be secured to such rear frame members on each side of the rear wheel; and clamps adapted to clamp around each support bar and be secured to said laterally spaced mounting means, said clamps each comprising a strap formed to have a round portion for incompletely encircling the support bar tubing and projecting ears with holes for a clamping bolt, the ears being spaced so that they do not completely contact when the bolt is tightened, each clamp having internal dimples caused by indention of the metal along a narrow area of the outside wall of the round portion adjacent the corner between each of the ears and the round portion, said dimple formations ending short of the rims of the round portion to provide small inward upset areas of the inner wall of said round portion which provide concentrated pressure areas against the support bars when the clamp is tightened on the bar.

3. An adjustable saddle support assembly according to claim 2 in which the end areas of said indentations are slightly wider and deeper than the main part so that each clamp has four inward pressure areas to provide a slip resisting grip on the support bar.

4. An adjustable bicycle saddle support assembly mountable on a bicycle frame having a substantially vertically adjustable seat post and rear frame members on each side of the rear wheel, and an elongated saddle having forward means securable to the seat post and laterally spaced mounting means near the rear end: said assembly comprising telescoping bar structures on each side of the saddle and frame, each structure comprising an upper tubular section having means for securing it to a mounting means near the rear of the saddle; a lower section of larger diameter adapted to be secured to a rear frame member, the upper section slidingly telescoping within the lower section; and a helical spring slideable around both sections and spanning the upper end of the lower section, said spring having the upper coils thereof secured to the upper section and the lower coils secured to the lower section, said spring having a length and spring rate to provide desired amount of resilient downward sliding of the upper section when a rider of average weight sits on the saddle.

5. An adjustable saddle support assembly according to claim 4 in which the end coils of said springs are secured by forming them to have smaller inside diameters than the tubing sections and being nested in annular grooves formed in the wall of the tubing section.

References Cited

UNITED STATES PATENTS

| | | | |
|---|---|---|---|
| D. 214,820 | 7/1969 | Gordon | D90—8 |
| 2,467,676 | 4/1949 | Labine | 297—211 |
| 2,530,498 | 11/1950 | Atwood et al. | 280—304 |
| 3,408,090 | 10/1968 | Fritz et al. | 280—278 |
| 3,409,259 | 11/1968 | Cross | 248—230X |
| 3,414,223 | 12/1968 | Pawsat | 248—230 |
| 3,466,086 | 9/1969 | James et al. | 280—283X |
| 3,481,628 | 12/1969 | Brilando et al. | 280—283 |
| 3,486,727 | 12/1969 | Timms | 280—289 |

KENNETH H. BETTS, Primary Examiner

U.S. Cl. X.R.

297—209; 280—289